(12) United States Patent
Hoskinson et al.

(10) Patent No.: US 7,744,450 B2
(45) Date of Patent: Jun. 29, 2010

(54) PARTICULATE RESIDUE SEPARATORS FOR HARVESTING DEVICES

(75) Inventors: Reed L. Hoskinson, Rigby, ID (US); Kevin L. Kenney, Idaho Falls, ID (US); Christopher T. Wright, Idaho Falls, ID (US); John R. Hess, Idaho Falls, ID (US)

(73) Assignee: Battelle Energy Alliance, LLC, Idaho Falls, ID (US)

( * ) Notice: Subject to any disclaimer, the term of this patent is extended or adjusted under 35 U.S.C. 154(b) by 629 days.

(21) Appl. No.: 11/536,076

(22) Filed: Sep. 28, 2006

(65) Prior Publication Data

US 2008/0081680 A1    Apr. 3, 2008

(51) Int. Cl.
*A01F 12/44*    (2006.01)
(52) U.S. Cl. ......................... 460/84; 460/111
(58) Field of Classification Search ............... 460/111, 460/112, 901, 113, 84, 119; 239/239, 650, 239/663, 682, 684, 667, 677, 661; 241/240, 241/241, 243
See application file for complete search history.

(56) References Cited

U.S. PATENT DOCUMENTS

| | | | | |
|---|---|---|---|---|
| 2,626,159 | A * | 1/1953 | Thompson | 239/689 |
| 2,708,582 | A * | 5/1955 | Adams | 239/650 |
| 3,071,246 | A * | 1/1963 | Schimke | 209/27 |
| 3,107,475 | A * | 10/1963 | Gustafson | 56/328.1 |
| 3,317,064 | A * | 5/1967 | Fingerut | 406/41 |
| 3,669,122 | A * | 6/1972 | Rowland-Hill | 460/73 |
| 3,721,075 | A * | 3/1973 | Weiberg | 56/13.5 |
| 3,833,006 | A * | 9/1974 | Temple | 460/99 |
| 4,250,897 | A * | 2/1981 | Glaser | 460/69 |
| 4,310,005 | A * | 1/1982 | De Busscher et al. | 460/73 |
| 4,489,734 | A * | 12/1984 | Van Overschelde | 460/81 |
| 4,617,942 | A * | 10/1986 | Garner | 460/112 |
| 4,711,253 | A * | 12/1987 | Anderson | 460/100 |
| 4,921,469 | A * | 5/1990 | Scharf | 460/10 |
| 5,021,030 | A * | 6/1991 | Halford et al. | 460/111 |
| 5,120,275 | A * | 6/1992 | Zacharias | 460/111 |
| 5,569,081 | A * | 10/1996 | Baumgarten et al. | 460/112 |
| 5,797,793 | A * | 8/1998 | Matousek et al. | 460/111 |
| 5,941,768 | A * | 8/1999 | Flamme | 460/114 |
| 6,354,938 | B1 * | 3/2002 | Schrattenecker | 460/112 |
| 6,500,064 | B1 * | 12/2002 | Schrattenecker | 460/112 |
| 6,547,169 | B1 * | 4/2003 | Matousek et al. | 239/661 |
| 6,554,701 | B1 * | 4/2003 | Wolters | 460/101 |
| 6,598,812 | B1 * | 7/2003 | Matousek et al. | 239/682 |
| 6,656,038 | B1 * | 12/2003 | Persson | 460/112 |
| 7,063,613 | B2 * | 6/2006 | Weichholdt | 460/112 |
| 7,066,810 | B2 * | 6/2006 | Farley et al. | 460/112 |
| 7,156,732 | B2 * | 1/2007 | Kuhn et al. | 460/111 |
| 7,381,130 | B2 * | 6/2008 | Smith | 460/6 |
| 7,455,584 | B2 * | 11/2008 | Farley et al. | 460/111 |

(Continued)

*Primary Examiner*—Árpád Fábián-Kovács
(74) *Attorney, Agent, or Firm*—TraskBritt

(57) ABSTRACT

A particulate residue separator and a method for separating a particulate residue stream may include a plenum borne by a harvesting device, and have a first, intake end and a second, exhaust end; first and second particulate residue air streams which are formed by the harvesting device and which travel, at least in part, along the plenum and in a direction of the second, exhaust end; and a baffle assembly which is located in partially occluding relation relative to the plenum, and which substantially separates the first and second particulate residue air streams.

10 Claims, 1 Drawing Sheet

U.S. PATENT DOCUMENTS

2003/0114207 A1* 6/2003 Wolters et al. .............. 460/111
2004/0092298 A1* 5/2004 Holmen ...................... 460/111
2004/0137974 A1* 7/2004 Weichholdt ................. 460/112
2004/0242291 A1* 12/2004 Weichholdt ................. 460/112

* cited by examiner

PARTICULATE RESIDUE SEPARATORS FOR HARVESTING DEVICES

GOVERNMENT RIGHTS

This invention was made with government support under Contract Number DE-AC07-05ID14517 awarded by the United States Department of Energy. The government has certain rights in the invention.

TECHNICAL FIELD

The present invention relates to a particulate residue separator and a method for separating a particulate residue stream, and more particularly to an apparatus and method that is useful for separating anatomical fractions in a biomass residue stream so as to produce resulting anatomical fractions that can be effectively utilized for various downstream purposes.

BACKGROUND OF THE INVENTION

Various studies have been conducted on assorted biomass fractionalization schemes in order to determine the feasibility of providing enhanced fractionalization for a biomass stream so as to produce anatomical fractions that might be useful in various downstream processes such as for producing enhanced animal feed; or further providing an anatomical fraction that can be used as a feedstock that could yield increased amounts of ethanol when supplied to a downstream fermentation process. For example, the University of Kentucky conducted a study that looked at the composition of corn and wheat stover using identical procedures. These studies showed that that the glucan and xylan sugar content variability can be greater than 10% for stover and cereal straw anatomical fractions. Further, lignin content variability between anatomical fractions can approach 6%. The compositional variability of these constituents between anatomical fractions is sometimes significant, and further has some degree of stable predictability. Consequently, these same materials could be exploited to improve a feedstock for a downstream fermentation process that has improved structural carbohydrate content. Those skilled in the art have long recognized that ethanol yields and fermentation processes are a function of the feedstock structural carbohydrate content.

In addition to the foregoing, recent studies have compared the response of the individual fractions of corn and wheat stover to various fermentation pretreatment schemes. These studies show that the anatomical fractions respond in a different manner to pretreatment. Further, some fractions do not need pretreatment, and for those that do, some respond better to pretreatment than others. Since pretreatment is currently the most expensive step in bioprocessing for the production of ethanol from a biomass, these studies suggest that it may be less expensive to produce ethanol from some fractions than others. In fact, an anatomical fraction that contains less digestible sugars than another, but whose sugars are more accessible, and therefore easier to convert to ethanol, may be a more preferred faction and considered a much higher quality feedstock.

A particulate residue separator and a method for separating particulate residue streams is the subject matter of the present application.

SUMMARY OF THE INVENTION

A first aspect of the present invention relates to a particulate residue separator for a harvesting device that includes a plenum borne by a harvesting device, and having a first, intake end, and a second, exhaust end; first and second particulate residue air streams that are formed by the harvesting device and that travel, at least in part, along the plenum and in the direction of the second, exhaust end; and a baffle that is located in partially occluding relation relative to the plenum, and that substantially separates the first and second particulate residue air streams.

Another aspect of the present invention relates to a particulate residue separator for a harvesting device that includes a harvesting assembly that performs a harvesting function, and that produces a particulate residue stream that has at least a first and a second particulate residue fraction as a result of the harvesting function; a plenum borne by the harvesting assembly that has a first, intake end, a second, exhaust end, and a length dimension; means borne by the harvesting assembly for forming and propelling the first and second particulate residue fractions into first and second particulate residue air streams that travel, at least in part, along the plenum, and in the direction of the second, exhaust end; and a baffle mounted within the plenum and located at the second, exhaust end thereof, and that has a length dimension that is less than about one-half the length dimension of the plenum, and that is further oriented relative to the plenum such that it does not substantially impede the movement of the first and second particulate residue air streams while simultaneously maintaining the separation to the first and second particulate residue air steams at the second, exhaust end (i.e., a discharge end) of the plenum, and further does not impede the harvesting function.

Another aspect of the present invention relates to a method for separating a particulate residue air stream that includes the steps of providing a harvesting device that has a plenum, and wherein the plenum has a first, intake end, and a second, exhaust end; generating a first and a second particulate residue air stream within the plenum and that moves in the direction of the second, exhaust end; and positioning a baffle near the second, exhaust end, and within the plenum so as to maintain the two particulate residue air streams substantially separated upon discharge from the plenum.

Yet another aspect of the present invention relates to a method for separating particulate residue that includes the steps of providing a crop to be harvested; providing a harvesting device that has at least one plenum and that generates first and second particulate residue air streams, and wherein the first and second particulate residue air streams each have a discrete particulate residue fraction, and wherein the plenum has a first, intake end, and a second, exhaust end; harvesting the crop with the harvesting device while simultaneously producing the first and second particulate residue fractions during the harvesting of the crop; propelling the respective first and second particulate residue fractions, at least in part, along the plenum by means of the first and second particulate residue air streams and in the direction of the second, exhaust end; maintaining the separation of the first and second particulate residue air streams at the second, exhaust end of the plenum; and collecting the respective particulate residue fractions from the first and second particulate residue air streams for further processing following the exhaust of the first and second particulate residue air streams from the second, exhaust end of the plenum.

These and other aspects of the present invention will be described in greater detail hereinafter.

BRIEF DESCRIPTION OF THE DRAWING

Preferred embodiments of the invention are described below with reference to the following accompanying drawing.

DETAILED DESCRIPTION OF THE PREFERRED EMBODIMENT

Figure 1:
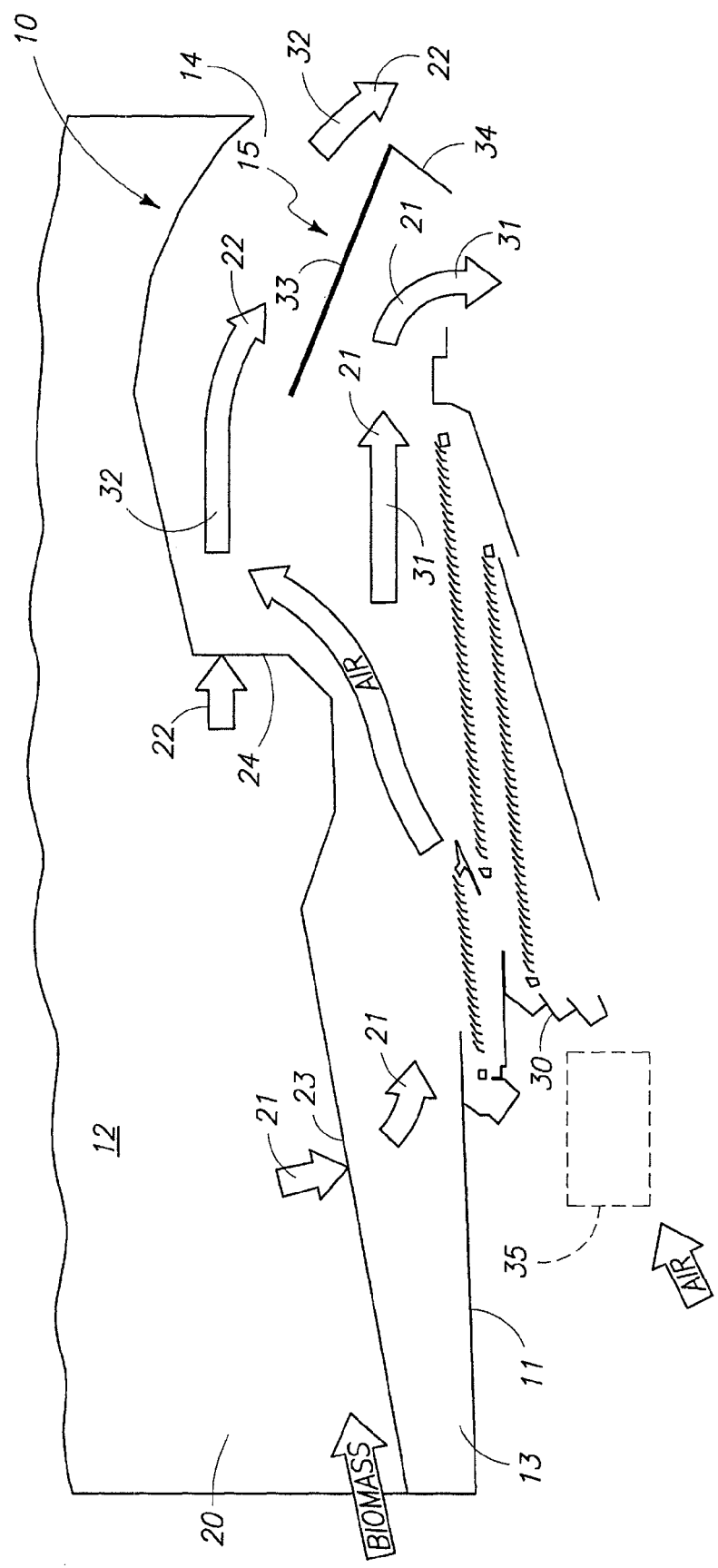
FIG. 1 depicts a fragmentary, transverse, vertical sectional view taken through a harvesting device, which shows the present invention positioned therein.

This disclosure of the invention is submitted in furtherance of the constitutional purposes of the U.S. Patent Laws "to promote the progress of science and useful arts" (Article 1, Section 8).

A particulate residue separator in accordance with the teachings of the present invention is generally indicated by the numeral 10 in FIG. 1. As seen therein, the particulate residue separator 10 includes an air plenum 11, which is made integral with a harvesting device 12, such as a combine of conventional design. The air plenum 11 has a first, intake end 13, and an opposite, second, exhaust end 14. Additionally, the particulate residue separator 10 includes a baffle 15 that is positioned within the air plenum 11 and located at the second, exhaust end 14, thereof. Still further, it will be understood that the harvesting device 12 includes a biomass intake region 20, which is located above and near the first, intake end 13 of the air plenum 11. Those skilled in the art will recognize that a biomass such as wheat, corn, or the like, that is being harvested will pass through the biomass intake region 20 and will then be processed, or acted upon by rotors, cylinders or similar assemblies (not shown) in order to separate the crop from the related stems, leaves and other materials associated with the crop. In the case of wheat, for example, the wheat would be received within the biomass intake region 20, and then the harvesting device 12 would convert the crop into first and second particulate residue fractions 21 and 22 (i.e., chaff and straw, respectively). A first particulate residue intake 23 would receive, for example, the first particulate residue fraction 21 (i.e., chaff), and which would enter the plenum 11 along a surface labeled 23, the first particulate residue intake 23. This first particulate residue fraction 21 would then enter into the plenum 11, and subsequently travel in the direction of the second, exhaust end 14. Still further, a second particulate residue intake 24 is provided, and which would receive the second particulate residue fraction 22 (i.e., straw). Again the second particulate residue fraction 22 would enter the plenum 11 at a location that is generally downstream of the first particulate residue intake 23, and travel in the direction of the second, exhaust end 14 of the plenum 11.

As seen in FIG. 1, an outside air intake 30 is provided. A fan assembly 35, shown by a dashed line, and which is borne by the harvesting device 12, would blow the outside air upwardly into the plenum 11 so that the outside air would travel in the direction of the second, exhaust end 14. Movement of outside air through the outside air intake 30 and into the plenum 11 creates or forms first and second particulate residue air streams 31 and 32, respectively, which predominantly carry the first and second particulate residue fractions 21 and 22 in the direction of the second, exhaust end 14.

As will be seen from FIG. 1, a particulate residue separator 10 for a harvesting device 12 includes a plenum 11 borne by the harvesting device 12, which has a first, intake end 13; and a second, exhaust end 14; first and second particulate residue air streams 31 and 32 that are formed by the harvesting device 12 and that travel, at least in part, along the plenum 11 and in the direction of the second, exhaust end 14; and a baffle 15 that is located in partially occluding relation relative to the plenum 11 and that substantially separates the first and second particulate residue air streams 31 and 32, respectively, at the second, exhaust end 14. As seen in FIG. 1, the baffle 15 is located within, and near the second, exhaust end 14 of the plenum 11, which further generally extends in the direction of the first, intake end 13 of the plenum 11. As earlier discussed, the preponderance of the first particulate residue air stream 31 in the arrangement as seen in FIG. 1, may comprise a first particulate residue fraction 21 (i.e., chaff), and the preponderance of the second particulate residue air stream 32 may comprise a second particulate residue fraction 22 (i.e., straw). As seen in FIG. 1, the second, exhaust end 14 of the plenum 11 has a width dimension, and it should be understood that the baffle 15 has a width dimension that is less than about the width dimension of the plenum 11 when it is measured at the second, exhaust end 14 thereof. It will be appreciated by a study of FIG. 1, that the baffle 15 is oriented within the plenum 11 so as to substantially eliminate mixing of the first and second particulate residue air streams 31 and 32 at the second, exhaust end 14 thereof, and further does not substantially impede the movement of the first and second particulate residue air streams 31 and 32. Still further, and as will be appreciated from the previous discussion, the harvesting device 12 has a harvesting function that is well known in the art, and the baffle 15 is mounted in such an orientation whereby the baffle 15 does not substantially impede the harvesting function of the harvesting device 12. In one form of the invention, the baffle 15 has a width dimension of at least about 52 inches to about 56 inches, and further has a length dimension that is less than about one-half the length dimension of the plenum 11. As seen in FIG. 1, the baffle 15 has a first major portion 33, and a second minor portion 34, which is oriented in an acute, angulated orientation relative to the first major portion 33. Additionally, the first major portion 33 and the second minor portion 34 each have a length dimension, wherein the length dimension of the second minor portion 34 of the baffle 15 is less than about one-half the length dimension of the first major portion 33. As seen in FIG. 1, the second minor portion 34 has the effect of deflecting, at least in part, the second particulate residue air stream 32 as it departs from the second, exhaust end 14 of the plenum 11. It should be understood that the first major portion 33 and the second minor portion 34 of the baffle 15 may be substantially planar, or further may be non-planar depending upon the harvesting device 12 upon which it is deployed. Still further, the baffle 15 may be fabricated as a porous or nonporous structure.

The present invention also relates to a method for separating a particulate residue stream that broadly includes the steps of providing a harvesting device 12 that has a plenum 11, and wherein the plenum has a first, intake end 13, and a second, exhaust end 14; generating a first and a second particulate residue air stream 31 and 32 within the plenum 11, which moves in the direction of the second, exhaust end 14; and positioning a baffle 15 near the second, exhaust end 14, and within the plenum 11 so as to maintain the two particulate residue air streams 31 and 32 substantially separated upon discharge from the plenum 11. As should be understood, the step of positioning the baffle 15 near the second, exhaust end 14 of the plenum 11 further comprises a step of orienting the baffle 15 so as to not substantially impede the first and second particulate residue air streams 31 and 32 at the second, exhaust end 14 of the plenum 11. Still further, the method of the present invention includes a step of providing a rigid substrate; and forming the baffle 15 from the rigid substrate, which is dimensioned so as to be received within the plenum 11, and which is further located between the first and second particulate residue air streams 31 and 32. As earlier discussed, the baffle 15 may be substantially planar or non-planar and, further, the baffle 15 may be, at least in part, porous or non-porous depending upon the design of the harvesting device 12.

More specifically, the method for separating a particulate residue of the present invention includes the steps of providing a crop or biomass to be harvested; and providing a harvesting device 12 that has at least one plenum 11 and that generates first and second particulate residue air streams 31 and 32, and wherein the first and second particulate residue air streams 31 and 32 each has a discrete particulate residue fractions 21 and 22, and wherein the at least one plenum 11 has a first, intake end 13, and a second, exhaust end 14. The method of the present invention further includes a step of harvesting the crop or biomass that enters into a biomass intake region 20 of a harvesting device 12 while simultaneously producing the first and second particulate residue fractions 21 and 22 during the harvesting of the crop. The method includes another step of propelling the respective first and second particulate residue fractions 21 and 22, at least in part, along the plenum 11 by means of the first and second particulate residue air streams 31 and 32 and in a direction of the second, exhaust end 14. Still further, the method includes another step of maintaining separation of the first and second particulate residue air streams 31 and 32 at the second, exhaust end 14 of the plenum 11; and collecting the respective first and second particulate residue fractions 21 and 22 from the first and second particulate residue streams 31 and 32 for further processing, following exhaust of the first and second particulate residue air streams from the second, exhaust end 14 of the plenum 11. As earlier discussed, the step of positioning the baffle 15 in the plenum 11 at the second, exhaust end 14 thereof further includes a step of orienting the baffle 15 within the plenum 11 so as to not substantially impede movement of the first and second particulate residue air streams 31 and 32 along the plenum 11, and to further not substantially effect a harvesting function of the harvesting device 12. In the arrangement as seen in FIG. 1, the baffle 15 has a width dimension of greater than about 52 inches. Still further, after the step of collecting the respective first and second particulate residue fractions 21 and 22, the method includes another step of generating ethanol by the use of at least one of the collected first and second particulate residue fractions 21 and 22.

Operation

The operation of the described embodiment of the present invention is believed to be readily apparent and is briefly summarized at this point.

A particulate residue separator 10 and a method for separating particulate residue is described herein. As seen in FIG. 1, the particulate residue separator 10 is made integral with a harvesting assembly 12, which performs a harvesting function and which produces a particulate residue stream that has at least a first and a second particulate residue fraction 21 and 22, as a result of the harvesting function. The apparatus seen in FIG. 1 includes a plenum 11 borne by the harvesting assembly 12, which has a first, intake end 13, a second, exhaust end 14, and a given length dimension. The particulate residue separator 10, as seen in FIG. 1, includes a means borne by the harvesting assembly 12 for forming and propelling the first and second particulate residue fractions 21 and 22 into first and second particulate residue air streams 31 and 32, which travel, at least in part, along the plenum 11, and in the direction of the second, exhaust end 14. A baffle 15 is mounted within the plenum 11, and is further located at the second, exhaust end 14, thereof. The baffle 15 has a length dimension that is less than about one-half the length dimension of the plenum 11, which is further oriented relative to the plenum 11 such that it does not substantially impede the movement of the first and second particulate residue air streams 31 and 32, while simultaneously maintaining the separation of the first and second particulate residue air steams 31 and 32 at the second, exhaust end 14 (i.e., a discharge end) of the plenum 11. The baffle 15 further does not impede the harvesting function of the harvesting device 12.

Therefore it will be seen that the present invention provides a convenient means whereby residue streams produced as a result of a harvesting function of a harvesting device can be utilized in downstream processes to produce value-added products not possible heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A particulate residue separator for a harvesting device, comprising:
  a plenum borne by a harvesting device, the plenum comprising:
    a first, intake end comprising:
      a first particulate residue intake positioned to receive a first particulate residue;
      a separate, second particulate residue intake downstream from the first particulate residue intake positioned to receive a second particulate residue, wherein the first particulate residue comprises chaff and the second particulate residue comprises straw; and
      an outside air intake upstream from the first particulate residue intake; and
    a second, exhaust end;
  a fan assembly positioned and configured to direct outside air through the outside air intake and form a first particulate residue air stream comprising the first particulate residue, and a second particulate residue air stream comprising the second particulate residue, and direct the first particulate residue air stream and the second particulate residue air stream along the plenum and in a direction of the second, exhaust end of the plenum; and
  a baffle located within the plenum downstream from the second particulate residue intake, wherein the baffle is angulated and comprises a first major portion and a second minor portion, the baffle positioned between a pathway of the first particulate residue air stream and a pathway of the second particulate residue air stream and sized, positioned and configured to substantially eliminate mixing of the first particulate residue of the first particulate residue air stream and the second particulate residue of the second particulate residue air stream and maintain the first and second particulate residues substantially separated upon discharge from the plenum for separate collection thereof, and not directed to a spreader or chopper for spreading on the ground, but rather to facilitate the separate collection of the first particulate residue and the second particulate residue for further processing of at least one of the first particulate residue and the second particulate residue.

2. The particulate residue separator of claim 1, wherein the baffle is located near the second, exhaust end of the plenum, and further extends in a direction of the first, intake end of the plenum.

3. The particulate residue separator of claim 1, wherein a preponderance of the first particulate residue of the first particulate residue air stream is chaff, and a preponderance of the second particulate residue of the second particulate residue air stream is straw.

4. The particulate residue separator of claim 1, wherein the second, exhaust end of the plenum has a width dimension, and wherein the baffle has a width dimension proximate to the second, exhaust end of the plenum that is less than the width dimension of the second, exhaust end of the plenum.

5. The particulate residue separator of claim 1, wherein the baffle is oriented within the plenum so as to not substantially impede movement of the first and second particulate residue air streams.

6. The particulate residue separator of claim 1, wherein the baffle has a width dimension of at least about 52 inches.

7. The particulate residue separator of claim 1, wherein the baffle is porous.

8. The particulate residue separator of claim 1, wherein the baffle is nonporous.

9. The particulate residue separator of claim 1, wherein the baffle has a substantially planar shape.

10. The particulate residue separator of claim 1, wherein the baffle has a nonplanar shape.

* * * * *

UNITED STATES PATENT AND TRADEMARK OFFICE
CERTIFICATE OF CORRECTION

PATENT NO. : 7,744,450 B2  
APPLICATION NO. : 11/536076  
DATED : June 29, 2010  
INVENTOR(S) : Reed L. Hoskinson et al.

Page 1 of 1

It is certified that error appears in the above-identified patent and that said Letters Patent is hereby corrected as shown below:

In the specification:
    COLUMN 1,    LINE 33,    change "that that" to --that--

Signed and Sealed this  
Twenty-sixth Day of February, 2013

Teresa Stanek Rea  
*Acting Director of the United States Patent and Trademark Office*